(12) United States Patent
Matsukawa

(10) Patent No.: US 8,881,761 B2
(45) Date of Patent: Nov. 11, 2014

(54) STEAM SUPPLY SYSTEM AND CHECK VALVE FOR USE THEREIN

(75) Inventor: Naoki Matsukawa, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 171 days.

(21) Appl. No.: 13/497,437

(22) PCT Filed: Aug. 6, 2010

(86) PCT No.: PCT/JP2010/063383
§ 371 (c)(1),
(2), (4) Date: May 31, 2012

(87) PCT Pub. No.: WO2011/036956
PCT Pub. Date: Mar. 31, 2011

(65) Prior Publication Data
US 2012/0234420 A1    Sep. 20, 2012

(30) Foreign Application Priority Data

Sep. 28, 2009    (JP) .................................. 2009-223196

(51) Int. Cl.
| | |
|---|---|
| F16K 15/02 | (2006.01) |
| F16K 17/04 | (2006.01) |
| F16K 21/04 | (2006.01) |
| F01K 9/00 | (2006.01) |
| F01K 7/40 | (2006.01) |
| F22B 37/02 | (2006.01) |
| F16K 15/06 | (2006.01) |

(52) U.S. Cl.
CPC ............... *F16K 15/063* (2013.01); *F22B 37/02* (2013.01)
USPC .......... 137/540; 122/479.5; 122/480; 60/661; 60/667; 251/121

(58) Field of Classification Search
USPC .......... 137/487.5, 488, 511–543.23; 203/DIG. 14; 60/660, 661, 666, 667; 122/459, 480, 479.5; 251/120, 121
See application file for complete search history.

(56) References Cited

U.S. PATENT DOCUMENTS

| | | | | |
|---|---|---|---|---|
| 1,471,229 | A * | 10/1923 | Williston | 137/533.31 |
| 4,688,755 | A * | 8/1987 | Pluviose | 251/121 |
| 6,524,436 | B2 * | 2/2003 | Kettunen et al. | 162/47 |
| 6,758,458 | B2 | 7/2004 | Ando et al. | |
| 7,108,244 | B2 * | 9/2006 | Hardin | 251/333 |
| 7,415,942 | B2 * | 8/2008 | Kumamoto | 122/15.1 |
| 2007/0235670 | A1 * | 10/2007 | Shindo et al. | 251/121 |
| 2007/0271938 | A1 * | 11/2007 | Shaffer | 62/228.1 |

FOREIGN PATENT DOCUMENTS

| | | |
|---|---|---|
| JP | 1157286 U | 10/1989 |
| JP | 2007332859 A | 12/2007 |
| JP | 2007333302 A | 12/2007 |
| JP | 2007333304 A | 12/2007 |

(Continued)

*Primary Examiner* — John Rivell
*Assistant Examiner* — Kevin Barss
(74) *Attorney, Agent, or Firm* — The Webb Law Firm

(57) ABSTRACT

A steam supply passage incorporates a pressure reducing valve and the passage further incorporates a steam ejector downstream of the pressure reducing valve. A suction portion of the steam ejector is connected to a re-evaporation tank for re-evaporating steam condensate via a suction passage. Passage steam of the pressure reducing valve is used as a driving steam for the steam ejector. In operation, re-evaporated steam within the re-evaporation tank is suctioned by the steam ejector to be mixed with the passage steam. The suction passage incorporates a check valve for preventing reverse flow of steam to the re-evaporation tank.

7 Claims, 5 Drawing Sheets

(56) References Cited

FOREIGN PATENT DOCUMENTS

| JP | 2009144609 A | 7/2009 |
| JP | 2009174719 A | 8/2009 |
| WO | 2007046379 A1 | 4/2007 |

* cited by examiner (a)

(b)

(a)                (b)

STEAM SUPPLY SYSTEM AND CHECK VALVE FOR USE THEREIN

TECHNICAL FIELD

The present invention relates to a steam supply system for supplying steam to a steam-using device in a plant such as a steam plant and relates also to a check valve for use therein.

BACKGROUND ART

Conventionally, according to a known steam supply system of the above-noted type, a steam supply passage incorporates a pressure reducing valve and the passage further incorporates a steam ejector downstream of the pressure reducing valve. A suction portion of the steam ejector is connected to a re-evaporation tank for re-evaporating steam condensate via a suction passage. Passage steam of the pressure reducing valve is used as a driving steam for the steam ejector. In operation, re-evaporated steam within the re-evaporation tank is suctioned by the steam ejector to be mixed with the passage steam. The suction passage incorporates a check valve for preventing reverse flow of steam to the re-evaporation tank (see, e.g. Patent Document 1 identified below).

Namely, this steam supply system is configured to achieve energy saving of the entire plant such as a steam plant by feeding re-evaporated steam present inside the re-evaporation tank to the steam-using device through the suction function of the steam ejector incorporated in the steam supply passage.

And, in the conventional technique, as an arrangement of allowing quick passage of re-evaporated steam for immediate realization of a valve closed state leads to reliable prevention of reverse flow, the check valve incorporated in the suction passage is provided with such inherent flow characteristics that an increase ratio of a flow rate associated with increase of its valve opening ratio is greater in a small opening ratio range with small valve opening ratios than in a large opening ratio range with large valve opening ratios (the inherent flow characteristics indicated by (a) in FIG. 2). For example, the valve is configured as shown in FIG. 8 in which a valve body 43 has a disc-like valve lid portion 42 whose face 42a on the side of a valve opening 41 is provided as a flat face. Meanwhile, numeral 44 denotes an inlet passage, numeral 45 denotes an outlet passage, numeral 46 denotes a compression coil spring (an example of the "urging means"), numeral 47 denotes a valve chamber, and numeral 48 denotes an annular valve seat. Also, FIG. 8 (a) shows a valve closed state and FIG. 8 (b) shows a valve opened state providing a flow rate (specifically a Cv value to be described later) of about 20%.

In the check valve shown in this FIG. 8, in association with a movement of the valve body 43 due to a fluid pressure of a fluid, the area of an annular gap A1 formed between a valve seat contacting portion (the outer peripheral portion of a bottom face 42a of the valve lid 42) of the valve body 43 and the annular valve seat 48 becomes the minimal area of the inlet passage of the fluid. Hence, the passing flow rate of the fluid is determined by the area of the annular gap A1 at the time of valve opening. As the increase ratio of the area of the gap A1 associated with increase in the valve opening ratio based on the amount of movement (stroke) of the valve body 43 away from the valve seat 48 is progressively decreased in association with increase of the area of the gap A1 in response to increase in the valve opening ratio. Hence, the check valve has the inherent flow characteristics of the type shown by (a) of FIG. 2.

Incidentally, in recent years, there are growing concurrent needs for further enhancement of energy saving effect of the whole plant through effective utilization of even a very small amount of re-evaporated steam by the suction function of the steam ejector and for accurate control of e.g. steam to be supplied to a steam-using device in response to various situations relating to e.g. the type of the steam-using device or the type of the plant including this device or a desire of the plant manager. And, the supplying steam for this steam-using device or the like is controlled by adjustment of the suction pressure of the steam ejector through adjustment of the opening ratio of the pressure reducing valve.

PRIOR ART DOCUMENT

Patent Document

Patent Document 1: Japanese Unexamined Patent Application Publication No. 2007-332859

SUMMARY OF THE INVENTION

Problems to be Solved by Invention

However, with the conventional steam supply system described above, since the check valve incorporated in the suction passage has the inherent flow characteristics that the increase ratio of the flow rate associated with increase in the valve opening ratio is relatively large in the small opening ratio range with the small valve opening ratios, the minimal adjustable flow rate based on the valve opening ratio of the check valve is not so large (in other words, the flexibility is not so large). Therefore, with this steam supply system, when the suction pressure of the steam ejector is kept fairly low through adjustment of the valve opening ratio of the pressure reducing valve for the purpose of effective utilization of the extremely small amount of re-evaporated steam, there occurs an unstable condition (so-called "chattering") that the check valve is repeatedly switched between a slightly valve opened state and the valve closed state (the valve body hits the valve seat repeatedly). And, due to this, there occurs the problem that the suction pressure of the steam ejector becomes unstable which renders the steam control by the pressure reducing valve inaccurate.

The present invention has been made with view to the above-described state of the art and its principal object is to effectively solve the above-described problem through rational improvement of the checking portion of the suction passage.

Means for Solving the Problem

According to the first characterizing feature of the present invention, the invention relates to a steam supply system wherein:

a steam supply passage incorporates a pressure reducing valve and the passage further incorporates a steam ejector downstream of the pressure reducing valve;

a suction portion of the steam ejector is connected to a re-evaporation tank for re-evaporating steam condensate via a suction passage;

passage steam of the pressure reducing valve is used as a driving steam for the steam ejector;

re-evaporated steam within the re-evaporation tank is suctioned by the steam ejector to be mixed with the passage steam:

the suction passage incorporates a check valve for preventing reverse flow of steam to the re-evaporation tank;

the valve opening ratio of the pressure reducing valve is adjusted in accordance with the temperature or pressure of steam on the downstream side of the steam ejector; and the check valve has an inherent flow characteristics that an increase ratio of a flow rate associated with increase of its valve opening ratio is equivalent between a small opening ratio range with small valve opening ratios and a large opening ratio range with large valve opening ratios or an inherent flow characteristics that the increase ratio is smaller in the small opening ratio range than in the large opening ratio range.

Namely, according to the above-described arrangement, in comparison with the conventional system, the increase ratio of the flow rate is smaller in the small opening ratio range of the check valve. In correspondence with this, the minimal adjustable flow rate under the valve opened state of the check valve becomes smaller, so that a smaller amount of re-evaporated steam can be passed under a stable condition with no chattering described above occurring in the check valve.

Therefore, when the suction pressure of the steam ejector is kept low through adjustment of the valve opening ratio of the pressure reducing valve for the purpose of effective utilization of the smaller amount of re-evaporated steam, it is possible to prevent the suction pressure of the steam ejector from becoming unstable due to occurrence of chattering of the check valve, thus enhancing the control accuracy of steam by the check valve.

Hence, in the above-described arrangement of adjusting the valve opening ratio of the pressure reducing valve in accordance with the temperature or pressure of the steam on the downstream side of the steam ejector in the steam supply passage, the temperature or pressure of the steam on the downstream side of the steam ejector can be controlled with higher accuracy, so that steam supply having high energy saving effect with utilization of re-evaporated steam can be effected also for a steam-using device which requires accurately controlled steam.

Moreover, in comparison with the conventional system, the increase ratio of the flow rate is greater in the large opening ratio range of the check valve described above. Hence, in the large opening ratio range where no chattering can occur, it is possible to cope with a large amount of re-evaporated steam quickly, thus allowing speedy passage of this large amount of re-evaporated steam.

Moreover, as described above, with the prevention of the chattering of the check valve, it is possible to restrict occurrence of wear or damage to the valve body or valve seat of the check valve. As a result, it is also possible to reduce the maintenance cost of the system.

According to the second characterizing feature of the present invention, the invention relates to a steam supply system wherein:

a steam supply passage incorporates a pressure reducing valve and the passage further incorporates a steam ejector downstream of the pressure reducing valve;

a suction portion of the steam ejector is connected to a re-evaporation tank for re-evaporating steam condensate via a suction passage;

passage steam of the pressure reducing valve is used as a driving steam for the steam ejector;

re-evaporated steam within the re-evaporation tank is suctioned by the steam ejector to be mixed with the passage steam:

the suction passage incorporates a check valve for preventing reverse flow of steam to the re-evaporation tank;

the valve opening ratio of the pressure reducing valve is adjusted in accordance with the temperature or pressure of passage steam past the pressure reducing valve; and the check valve has an inherent flow characteristics that an increase ratio of a flow rate associated with increase of its valve opening ratio is equivalent between a small opening ratio range with small valve opening ratios and a large opening ratio range with large valve opening ratios or an inherent flow characteristics that the increase ratio is smaller in the small opening ratio range than in the large opening ratio range.

That is, according to the above-described arrangement, like the first embodiment described above, in comparison with the conventional system, the increase ratio of the flow rate is smaller in the small opening ratio range of the check valve. In correspondence with this, the minimal adjustable flow rate under the valve opened state of the check valve becomes smaller, so that a smaller amount of re-evaporated steam can be passed under a stable condition with no chattering described above occurring in the check valve.

Therefore, when the suction pressure of the steam ejector is kept low through adjustment of the valve opening ratio of the pressure reducing valve for the purpose of effective utilization of the smaller amount of re-evaporated steam, it is possible to prevent the suction pressure of the steam ejector from becoming unstable due to occurrence of chattering of the check valve, thus enhancing the control accuracy of steam by the pressure reducing valve.

Hence, in the above-described arrangement of adjusting the valve opening ratio of the pressure reducing valve in accordance with the temperature or pressure of passage steam past the pressure reducing valve, the temperature or pressure of passage steam past the pressure reducing valve (in other words, the driving steam of the steam ejector) can be controlled with higher accuracy to suit the construction or required performance etc. of the steam ejector, so that efficiency enhancement or elongation of service life of the steam ejector can be achieved effectively.

Moreover, in comparison with the conventional system, the increase ratio of the flow rate is greater in the large opening ratio range of the check valve described above. Hence, in the large opening ratio range where no chattering can occur, it is possible to cope with a large amount of re-evaporated steam quickly, thus allowing speedy passage of this large amount of re-evaporated steam.

Moreover, as described above, with the prevention of the chattering of the check valve, it is possible to restrict occurrence of wear or damage to the valve body or valve seat of the check valve. As a result, it is also possible to reduce the maintenance cost of the system.

According to the third characterizing feature of the present invention, the invention relates to a steam supply system wherein:

a steam supply passage incorporates a pressure reducing valve and the passage further incorporates a steam ejector downstream of the pressure reducing valve;

a suction portion of the steam ejector is connected to a re-evaporation tank for re-evaporating steam condensate via a suction passage;

passage steam of the pressure reducing valve is used as a driving steam for the steam ejector;

re-evaporated steam within the re-evaporation tank is suctioned by the steam ejector to be mixed with the passage steam:

the suction passage incorporates a check valve for preventing reverse flow of steam to the re-evaporation tank;

the valve opening ratio of the pressure reducing valve is adjusted in accordance with the temperature or pressure of the re-evaporated steam inside the re-evaporation tank; and the check valve has an inherent flow characteristics that an increase ratio of a flow rate associated with increase of its valve opening ratio is equivalent between a small opening ratio range with small valve opening ratios and a large opening ratio range with large valve opening ratios or an inherent flow characteristics that the increase ratio is smaller in the small opening ratio range than in the large opening ratio range.

That is, according to the above-described arrangement, like the first and second embodiments described above, in comparison with the conventional system, the increase ratio of the flow rate is smaller in the small opening ratio range of the check valve. In correspondence with this, the minimal adjustable flow rate under the valve opened state of the check valve becomes smaller, so that a smaller amount of re-evaporated steam can be passed under a stable condition with no chattering described above occurring in the check valve.

Therefore, when the suction pressure of the steam ejector is kept low through adjustment of the valve opening ratio of the pressure reducing valve for the purpose of effective utilization of the smaller amount of re-evaporated steam, it is possible to prevent the suction pressure of the steam ejector from becoming unstable due to occurrence of chattering of the check valve, thus enhancing the control accuracy of steam by the pressure reducing valve.

Hence, in the above-described arrangement of adjusting the valve opening ratio of the pressure reducing valve in accordance with the temperature or pressure of the re-evaporated steam inside the re-evaporation tank, the temperature or pressure of the re-evaporated steam inside the re-evaporation tank can be controlled with higher accuracy. Then, it becomes possible for example to avoid the inconvenience of reduction in the utilization ratio of the re-evaporated steam due to the temperature or the pressure of the re-evaporated steam becoming higher than its initial temperature or pressure.

Moreover, in comparison with the conventional system, the increase ratio of the flow rate is greater in the large opening ratio range of the check valve described above. Hence, in the large opening ratio range where no chattering can occur, it is possible to cope with a large amount of re-evaporated steam quickly, thus allowing speedy passage of this large amount of re-evaporated steam.

Moreover, as described above, with the prevention of the chattering of the check valve, it is possible to restrict occurrence of wear or damage to the valve body or valve seat of the check valve. As a result, it is also possible to reduce the maintenance cost of the system.

According to the fourth characterizing feature of the present invention, the invention relates to a check valve comprising:

a valve body configured to be seated on an annular valve seat provided along an outer peripheral edge of a valve opening through face contact with the entire perimeter of the valve seat, thereby to close the valve opening;

an urging means for providing an urging force for urging the valve body to a valve closing side; and said valve opening being opened as the valve body moves away from the valve seat against the urging force of the urging means in response to a pressure of fluid entering the valve opening;

on the valve opening side of the valve body, there is provided a flow rate controlling projecting portion for controlling passing flow rate of the fluid in such a manner as to keep the area of a gap formed between a valve seat contacting portion of the valve body and an inner face of the valve opening smaller than the area of a gap formed between the valve seat contacting portion of the valve body and the valve seat when the valve body moves away from the valve seat; and said fluid rate controlling projecting portion has an outer contour configured to obtain said inherent flow characteristics.

According to the above-described arrangement, in providing the valve body configured to be seated on an annular valve seat provided along an outer peripheral edge of a valve opening through face contact with the entire perimeter of the valve seat, thereby to close the valve opening, the inherent flow characteristics is provided by the outer contour of the flow rate controlling projecting portion formed on the valve opening side of the valve body. Therefore, while high waterproof performance is ensured at the time of valve closing through the face contact between the valve seat contacting portion of the valve body and the entire perimeter of the annular valve seat, the inherent flow characteristics can be achieved under the stable condition with fewer troubles or erroneous operations.

The fifth characterizing feature of the present invention provides an arrangement suitable for implementing the fourth characterizing feature. According to this feature, a valve shaft is provided for moving/guiding the valve body along the direction perpendicular to the opening face of the valve opening; and the flow rate controlling projecting portion has a shape having symmetry or approximate symmetry about a center axis of the opening face of the valve opening.

According to the above-described arrangement, firstly, it is possible for the valve shaft for moving/guiding the valve body along the direction perpendicular to the opening face of the valve opening to effectively cause this movement of the valve body with the inflow pressure of the fluid.

Secondly, as the flow rate controlling projecting portion has a shape having symmetry or approximate symmetry (so-called rotational symmetry) about a center axis of the opening face of the valve opening, when the valve body moves along the direction perpendicular to the opening face as receiving the inflow pressure of the fluid, the valve body can be maintained under a predetermined posture with utilization of this fluid inflow pressure with receiving the fluid inflow pressure equally along the inflow direction of the fluid.

Therefore, it is possible to effectively prevent inconvenience of damage or wear being provided to interfering portions such as the supporting portion of the valve shaft or the connecting portion between the valve shaft and the valve body, due to displacement of the valve body from the predetermined posture in the course of the movement of the valve body, so that the predetermined performance can be maintained for a long period of time.

The sixth characterizing feature of the present invention provides an arrangement suitable for implementing the fourth or fifth characterizing feature. According to this feature, the flow rate controlling projecting portion has such an outer contour that in the process of movement of the valve body toward the valve seat until it is seated on the valve seat, the flow rate controlling projecting portion does not contact the inner peripheral face of the valve opening or the valve seat.

According to the above-described arrangement, it is possible to prevent inconvenience of contact between the fluid controlling projecting portion and the inner peripheral face of the valve opening and the valve seat in association with a valve closing movement causes a change in the outer face shape of the fluid controlling projecting portion. Therefore, it is possible to restrict reduction in the accuracy of fluid rate control associated with such change in the outer contour shape of the fluid controlling projecting portion.

MODES OF EMBODYING THE INVENTION

[First Embodiment]

Figure 1:
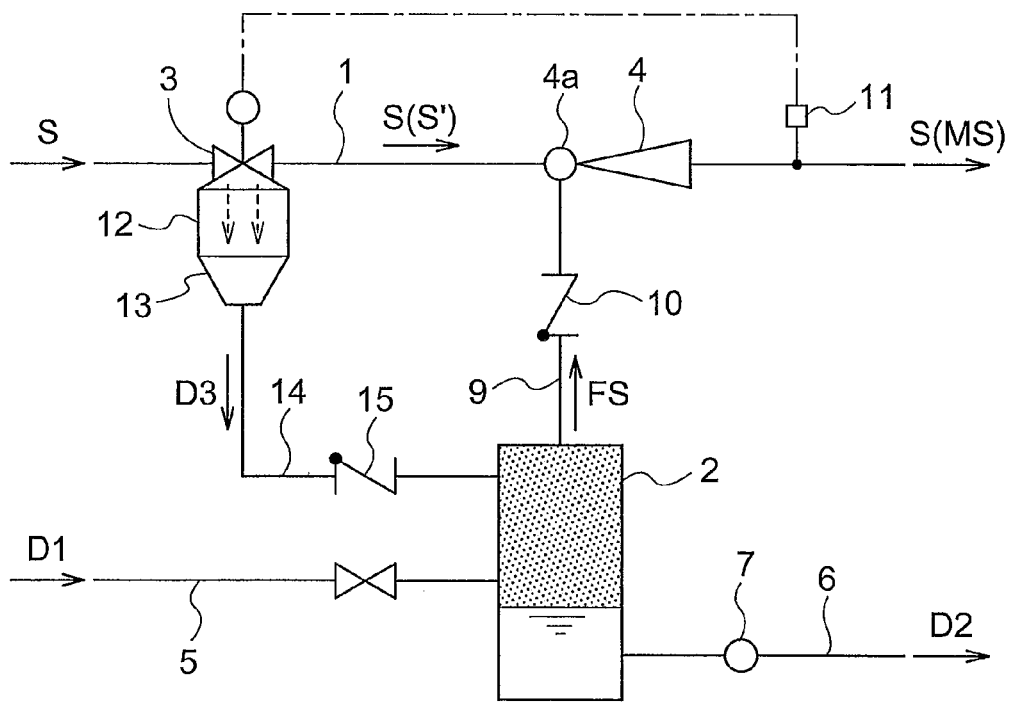
FIG. 1 is a construction diagram showing a first embodiment of a steam supply system.

FIG. 1 shows a schematic diagram of a steam supply system for use in a steam-using plant, such as a steam plant, in which a check valve 3 is incorporated in a steam supply passage 1 for supplying steam S (in this embodiment, an intermediate pressure or a low pressure steam) to a steam-using device (not shown), and in the steam supply passage 1, a steam ejector 4 is incorporated downstream of a pressure reducing valve 3.

Numeral 2 denotes a re-evaporation tank for re-evaporating a steam condensate D1 (in this embodiment, high temperature steam condensate generated from a steam having a higher pressure than the steam S). To this re-evaporation tank 2, there is connected a steam condensate inflow passage 5 for introducing the steam condensate D1. To the lower layer portion of the re-evaporation tank 2, there is connected a steam condensate discharge passage 6 for discharging the steam condensate D2 after re-evaporation. Further, the steam condensate discharge passage 6 incorporates a steam trap 7.

And, the upper layer region of the re-evaporation tank 2 is connected to a suction portion 4a of the steam ejector 4 via a suction passage 9 and this suction passage 9 incorporates a check valve 10 for checking reverse flow of steam to the re-evaporation tank 2.

That is, this steam supply system is configured such that with using passage steam S' of the pressure reducing valve 3 as a driving steam for the steam ejector 4, re-evaporated steam FS inside the re-evaporation tank 2 is drawn in by the steam ejector 4 to be mixed with the passage steam S' and the resultant mixed steam MA is supplied to a steam-using device.

Further, a pressure sensor 11 for detecting the pressure of the mixed steam MS is disposed downstream of the steam ejector 4 within the steam supply passage 1. And, this pressure sensor 11 is the pressure reducing valve 3 are electrically connected to each other, such that the valve opening ratio of the pressure reducing valve 3 is adjusted for causing the mixed steam MS have a pressure of a predetermined value, in accordance with a detection value of the pressure sensor 11 (an example of arrangement wherein the valve opening ratio of the pressure reducing valve is adjusted according to the temperature or pressure of the steam present downstream of the steam ejector 4 in the steam supply passage 1).

Figure 2:
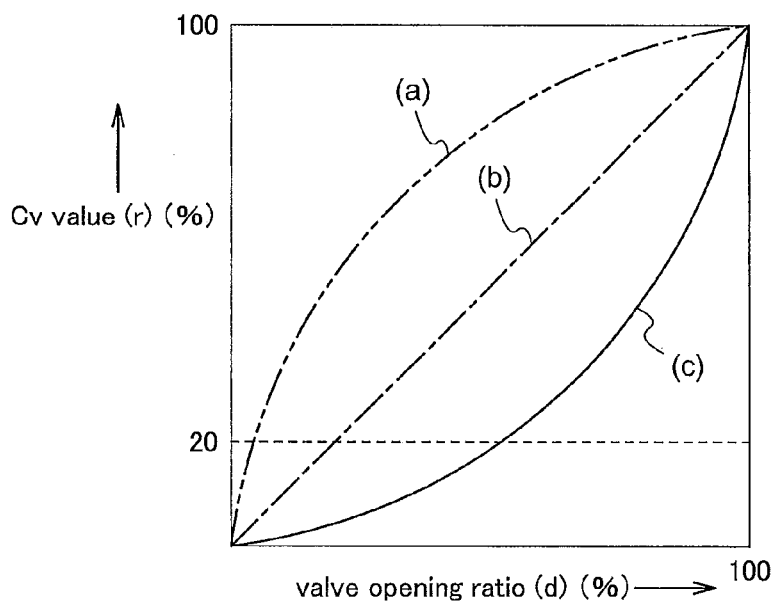
FIG. 2 is a graph showing relationship between the valve opening ratio and the flow rate of a check valve, FIG. 3 (a) is a vertical section showing a valve closed state of the check valve, (b) is an enlarged view of principal portions, FIG. 4 (a) is a vertical section showing a valve opened state of the check valve, (b) is an enlarged view of principal portions.

The check valve 10 preferably is provided with an inherent flow characteristics (the inherent flow characteristics indicated by (b) in FIG. 2) that an increase ratio of the flow rate (r) (in this embodiment, a flow rate coefficient (Cv value)) associated with increase in the valve opening ratio (d) (the valve opening ratio based on an amount of movement of a valve body 24) may be equivalent in a small opening ratio range with small valve opening ratios and in a large opening ratio range with large valve opening ratios or an inherent flow characteristics (the inherent flow characteristics indicated by (c) in FIG. 2) that the increase ratio is smaller in the small opening ratio range than in the large opening ratio range. In the instant embodiment, the check valve having the arrangement of the latter inherent flow characteristics is employed.

Incidentally, the Cv value is a numerical value representing the capacity of the valve. Specifically, this value is expressed by the following formula.

$$Cv = Q\sqrt{(G/\Delta p)}$$

Q: flow rate (gal (US)/min)
G: specific weight
$\Delta p$: differential pressure (1 lbf/in$^2$)

Namely, in this steam supply system, with using, as the check valve 10 incorporated within the suction passage 9, one having the inherent flow characteristics that the increase ratio is smaller in the small opening ratio range than in the large opening ratio range, the minimal adjustable flow rate is rendered small by the smaller increase ratio in the small opening ratio range of the check valve 10, thus allowing effective utilization of an extremely small amount of re-evaporated steam FS under a condition of no chattering occurring in the check valve 10 and further that a large amount of re-evaporated steam can be quickly coped with for its passage in the large opening ratio range where no chattering can occur, with the larger increase ratio in this large opening ratio range.

Downwardly of the pressure reducing valve 3, there are provided a gas-liquid separator 12 and a steam trap 13 integrated together for separating steam condensate from the inflow steam S to the pressure reducing valve 3. And, there is also provided a communication passage 14 for guiding the steam condensate D3 which has been separated through passage of the gas-liquid separator 12 and the steam trap 13 to the upper region of the re-evaporation tank 2. With these, there is realized a construction in which the passage steam S' with an extremely small mixing ratio of steam condensate is supplied to a nozzle portion (not shown) accommodated within the suction portion 4a of the steam ejector 4. Incidentally, numeral 15 denotes a check valve 15 incorporated within the communication passage 14.

Figure 3:
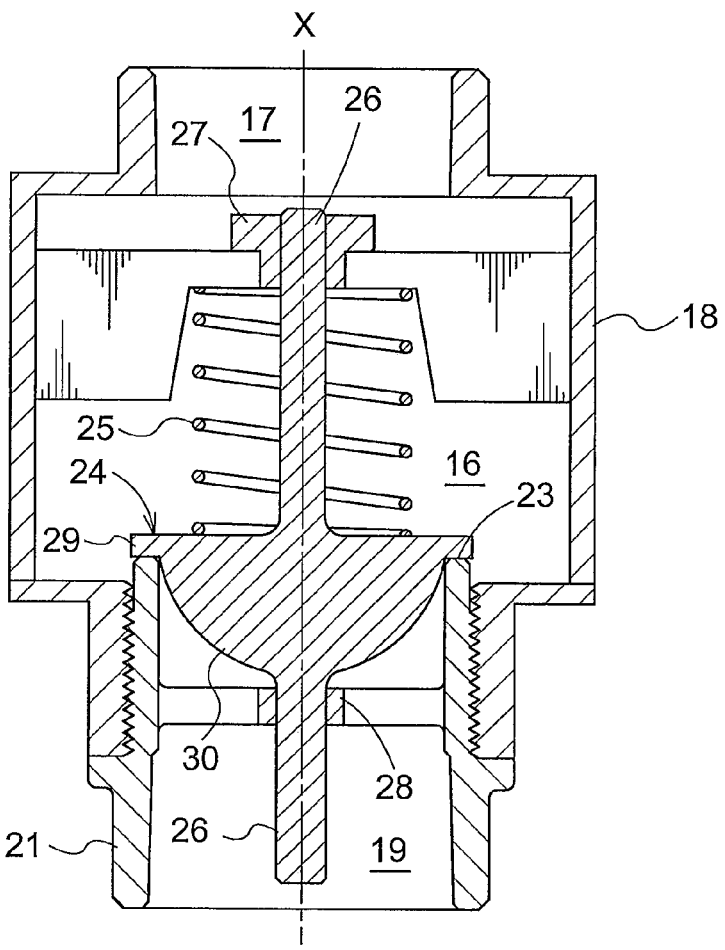
Figure 3:
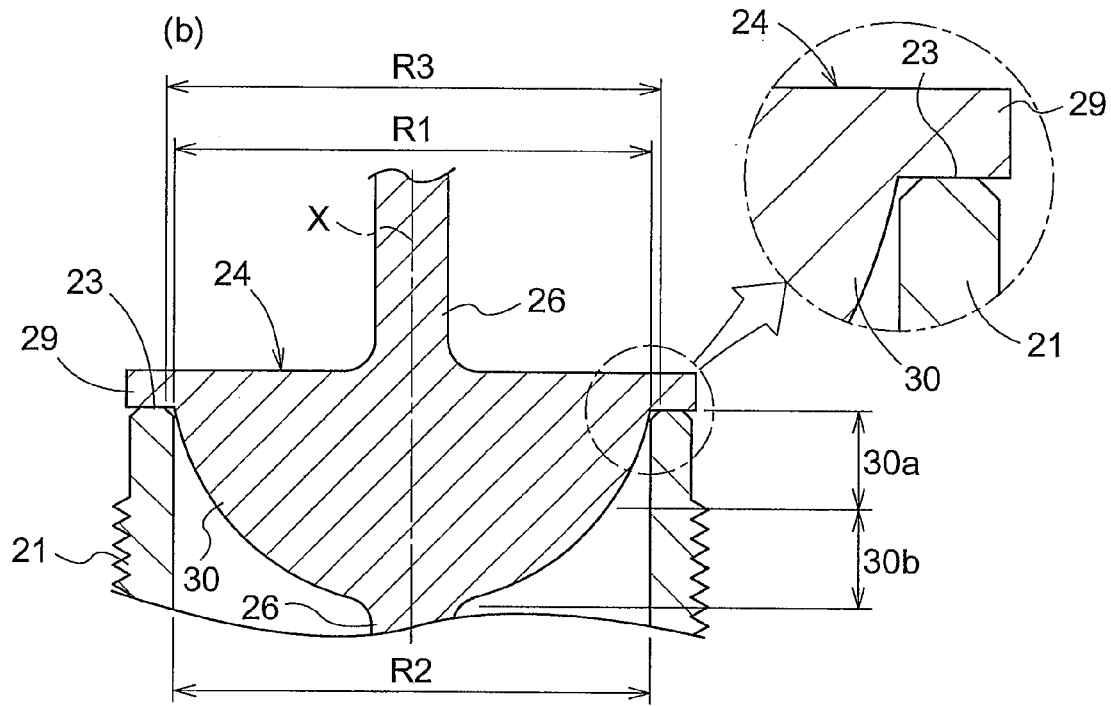
Figure 4:
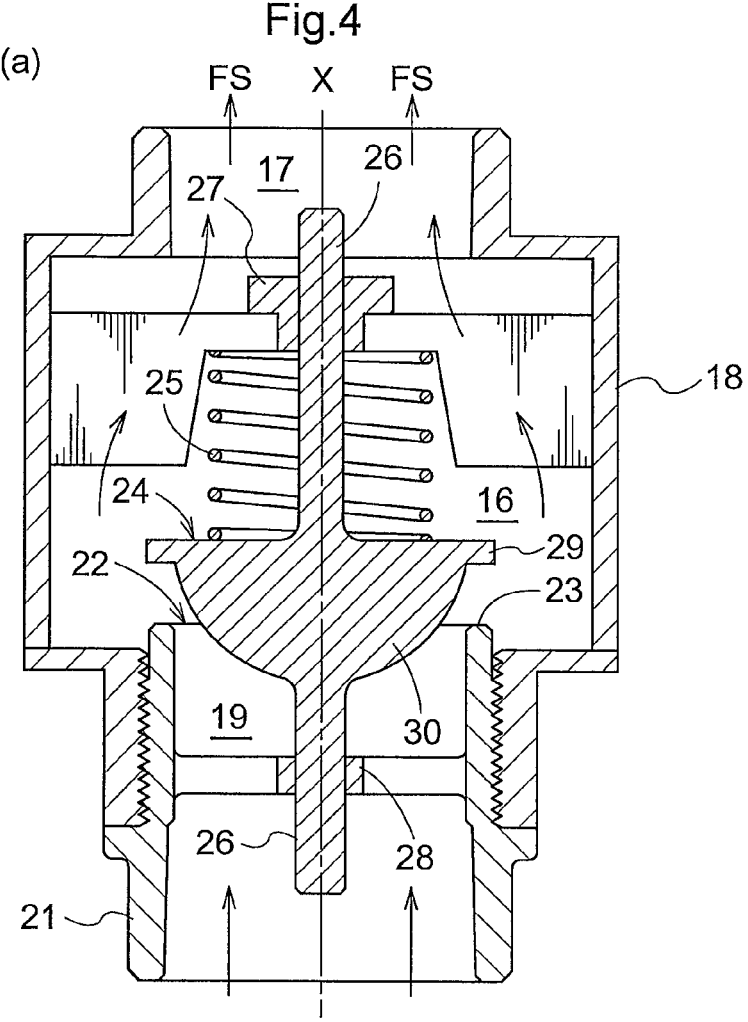
Figure 4:
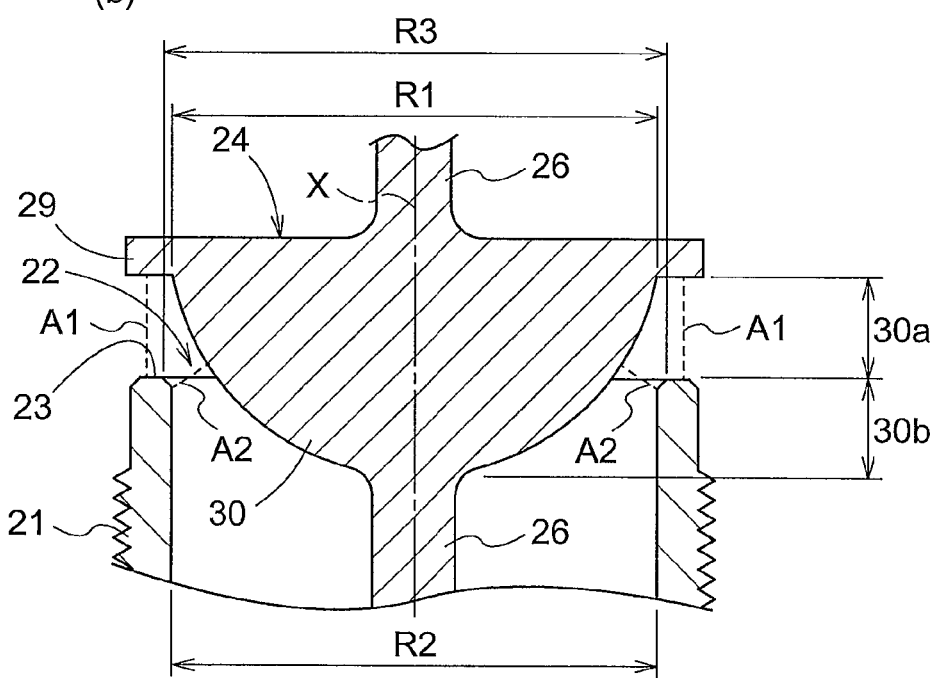

As shown in FIG. 3 and FIG. 4, the check valve 10 incorporated within the suction passage 9 comprises a gas-tightly integrated assembly of an outlet side valve case 18 having a valve chamber 16 and an outflow passage 17 therein and an approximately cylindrical inlet side valve case 21 having an inlet passage 19 and an annular valve seat 23.

The valve chamber 16 houses therein a valve body 24 configured to be seated on the valve seat 23 provided along an outer peripheral edge of a valve opening 22 through face contact with the entire perimeter of the valve seat 23, thereby to close the valve opening 22. The valve opening 22 opens up the inflow passage 19 to the valve chamber 16. In the valve chamber 16 and between the valve body 24 and the outlet side valve case 18, there is mounted a compression coil spring 25 (an example of "urging means") for urging the valve body 24 to its valve closing side.

Further, in the valve chamber 16, there is provided a valve shaft 26 for moving/guiding the valve body 24 along an X direction perpendicular to the opening face of the valve opening 22. This valve shaft 26 is comprised of a pair of bar-like portions projecting from opposed terminal ends of the valve body 24 to extend straight along the passing direction (in this embodiment, the X direction) of the fluid (in this embodiment, the re-evaporated steam FS).

At a portion of the valve chamber 16 adjacent the outflow passage 17, there is provided a one-end shaft bearing 27 for supporting one terminal end (the upper terminal end in the illustration) of the valve shaft 26. with the one terminal end being movable along the X direction perpendicular to the opening face of the valve opening 22. Inside the inflow passage 19, there is provided the other-end shaft bearing 28 for supporting the other terminal end of the valve shaft 26 with the other terminal end being slidable along the X direction.

That is, with this check valve 10, basically, the valve opening 22 is kept under the valve closed state (the condition shown in FIG. 3) with the urging force of the compression coil spring 25 and only when it is subjected to a predetermined fluid inflow pressure, the valve body 24 is moved away from the valve seat 23 (to the upper side in FIG. 3) against the urging force of the compression coil spring 25, thus realizing a valve opened state (the condition shown in FIG. 4). Meanwhile, the valve opened state shown in FIG. 4 is the condition of the Cv value of about 20%.

The valve body 24 comprises an integral construction of a valve lid portion 29 projecting in the form of a flange along the radial direction of the valve shaft 26, a flow rate controlling projecting portion 30 and the valve shaft 26. The flow rate controlling projecting portion 30 controls the passing flow rate of the re-evaporated steam FS by making the area of an annular gap (opening face) A1 formed between the valve seat contacting portion of the valve body 24 (specifically the outer peripheral portion of the bottom face of the valve lid portion 29) smaller than the area of a gap (opening face) A2 formed between the valve seat contacting portion of the valve body 24 and the inner face of the valve opening 22, when the valve body 24 away from the valve seat 23.

The shape (specifically, the outer contour shape) of the flow rate controlling projecting portion 30 is configured to obtain an inherent flow characteristics (the inherent flow characteristics indicated by (c) in FIG. 2) that an increase ratio of the flow rate (r) associated with increase of a valve opening ratio (d) is smaller in the small opening ratio range than in the large opening ratio range. Referring more particularly to this shape of the flow rate controlling projecting portion 30, a valve opening side half portion 30b has a sharper tapering than a valve lid side half portion 30a so that the increase ratio of the area of the gap A2 in the valve lid side half portion 30a (the upper half portion in the illustration) is smaller than the increase ratio of the area of the gap A2 in the valve opening side half portion 30b (the lower half portion in the illustration), in accordance with an amount of upward movement of the valve body 24. More specifically, the flow rate controlling projecting portion 30 has a semi-spherical or approximately semi-spherical shape having symmetry (so-called rotational symmetry) about the center axis of the opening face of the valve opening 22 (in this embodiment, about the axis along the X direction, about the axis of the valve shaft 26).

Further, the outer diameter R1 of the valve lid portion 29 side end of the flow rate controlling projecting portion 30 is made equal to the inner diameter R2 of the inflow passage 19; and with chamfering of the inner peripheral edge of the valve opening 22, the inner diameter R3 of the valve opening 22 is made slightly greater than the outer diameter R1 of the valve lid portion 29 side end of the flow rate controlling projecting portion 30. With these arrangements, in the course of movement of the valve body 24 toward the valve seat 23 prior to it being seated on the valve seat 23, the flow rate controlling projecting portion 30 does not contact the inner peripheral face of the valve opening 22 and does not contact the inner peripheral face of the valve opening 22 or the inner peripheral face of the inflow passage 19.

[Second Embodiment]

In the above-described first embodiment, there was explained an exemplary arrangement in which the valve opening ratio of the pressure reducing valve 3 is adjusted in accordance with the pressure of the steam present on the downstream side of the steam ejector 4 in the steam supply passage 1. Instead, it may be arranged such that the valve opening ratio of the pressure reducing valve 3 is adjusted in accordance with the pressure of the re-evaporated steam FS inside the re-evaporation tank 2.

Figure 5:
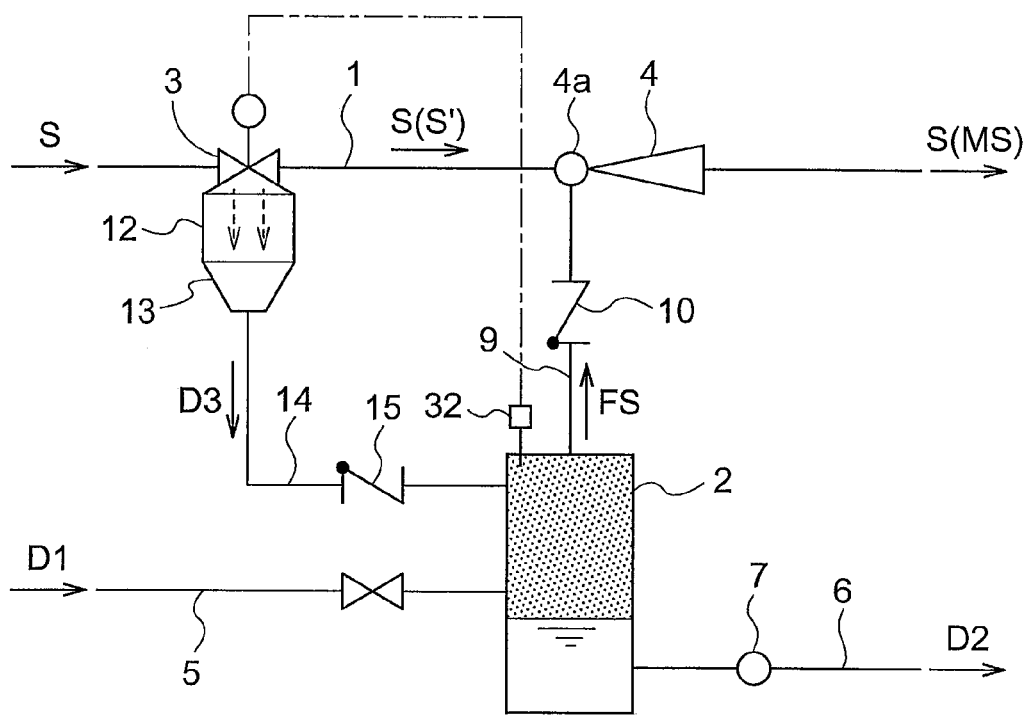
FIG. 5 is a construction diagram showing a second embodiment of the steam supply system.

In this embodiment, as shown in FIG. 5, a pressure sensor 32 for detecting the pressure of the re-evaporated steam FS inside the re-evaporation tank 2 is provided in this re-evaporation tank 2, and also this pressure sensor 32 is electrically connected to the pressure reducing valve 3, so that the valve opening ratio of the pressure reducing valve 3 is adjusted such that the pressure of the re-evaporated steam FS inside the re-evaporation tank 2 may obtain a predetermined value in accordance with the detection value of the pressure sensor 32.

Incidentally, the rest of the construction is same as that explained above in the foregoing embodiment. Therefore, the same construction portions are denoted with the same reference numerals or marks used in the first embodiment and discussion thereof will be omitted.

[Third Embodiment]

In the above-described first embodiment, there was explained an exemplary arrangement in which the valve opening ratio of the pressure reducing valve 3 is adjusted in accordance with the pressure of the steam present on the downstream side of the steam ejector 4 in the steam supply passage 1. Instead, it may be arranged such that the valve opening ratio of the pressure reducing valve 3 is adjusted in accordance with the pressure of the passage steam S' past the pressure reducing valve.

Figure 6:
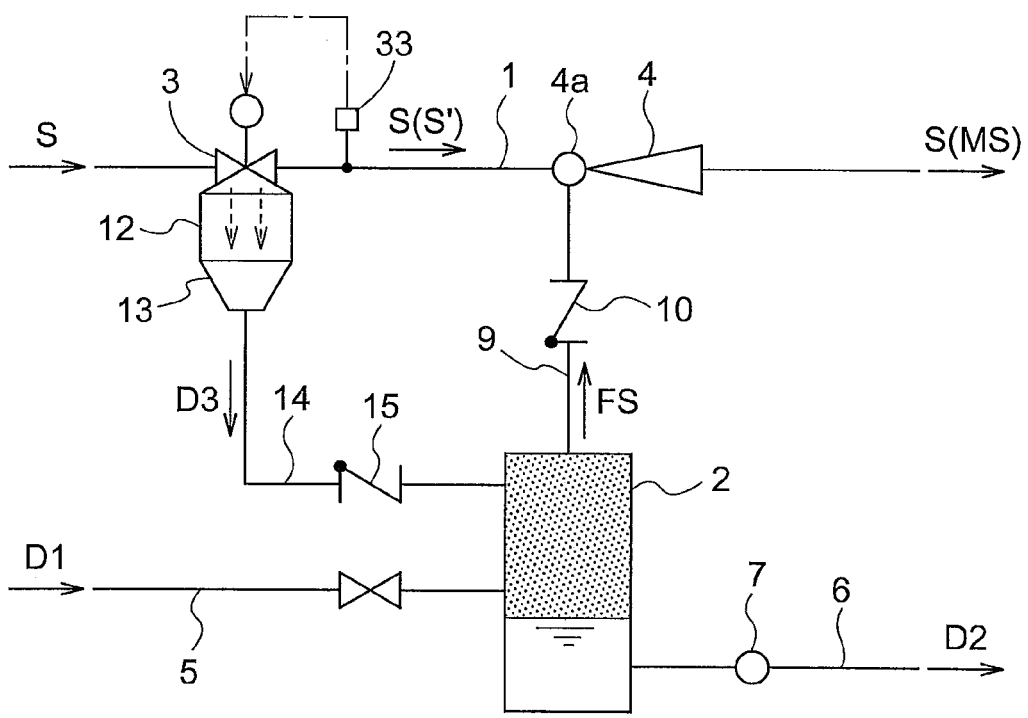
FIG. 6 is a construction diagram showing a third first embodiment of the steam supply system.

In this embodiment, as shown in FIG. 6, a pressure sensor 33 for detecting the pressure of the passage steam S' past the pressure reducing valve 3 is provided between the pressure reducing valve 3 and the steam ejector 2 in the steam supply passage 1, and also this pressure sensor 33 is electrically connected to the pressure reducing valve 3, so that the valve opening ratio of the pressure reducing valve 3 is adjusted such that the pressure of the re-evaporated steam FS within the re-evaporation tank 2 may obtain a predetermined value in accordance with the detection value of the pressure sensor 33.

Incidentally, the rest of the construction is same as that explained above in the foregoing embodiment. Therefore, the same construction portions are denoted with the same reference numerals or marks used in the first embodiment and discussion thereof will be omitted.

[Other Embodiments]

Figure 7:
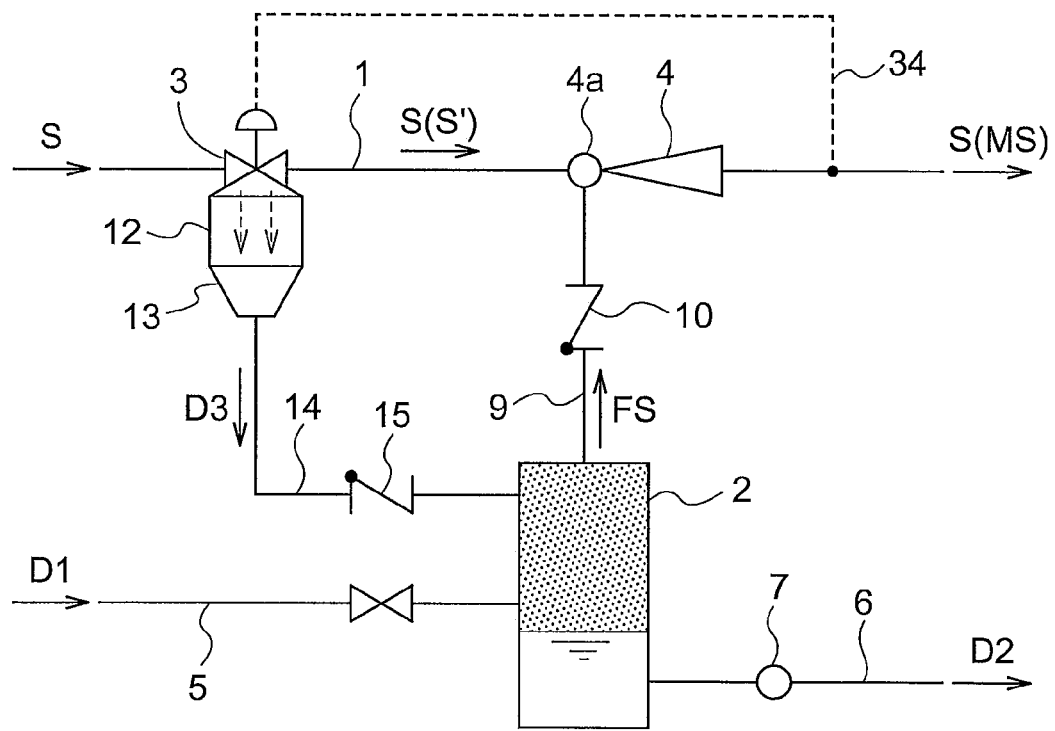
FIG. 7 is a construction diagram showing a further embodiment of the steam supply system, and FIG. 8 (a) is a vertical section showing a valve closed state of a conventional check valve, (b) is a vertical section showing a valve opened state of the conventional check valve.
Figure 8:
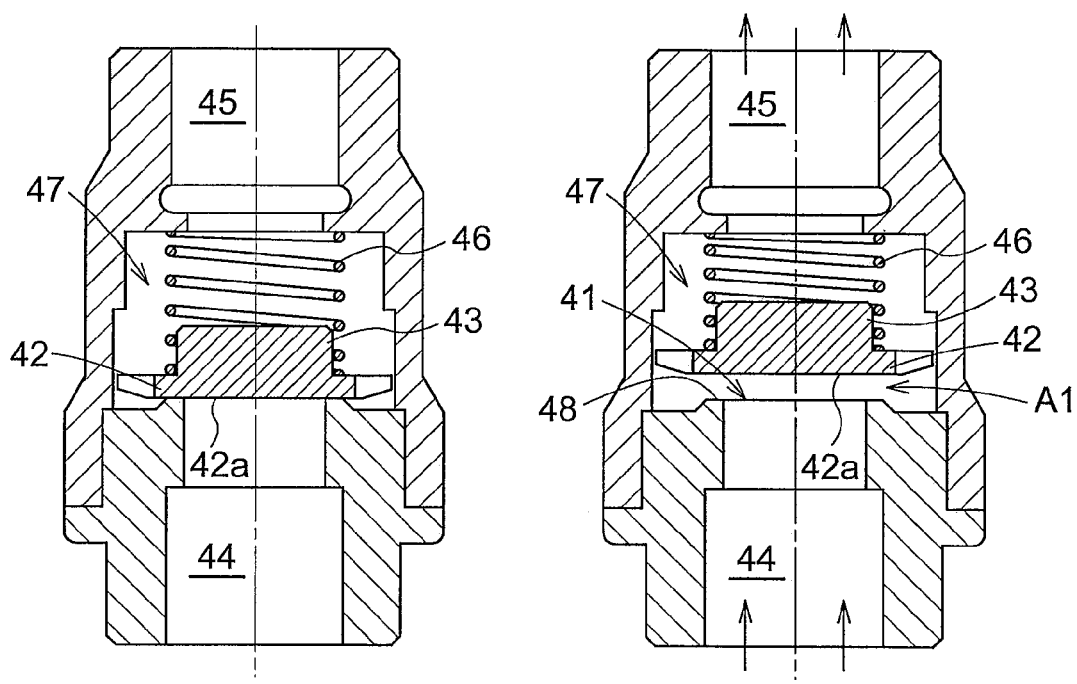

In the foregoing respective embodiments, there were explained exemplary arrangements wherein the valve opening ratio of the pressure reducing valve 3 is adjusted in accordance with the detection value of the pressure sensors 11, 32, 33. Instead, for instance, as shown in FIG. 7, it may be arranged such that the valve opening ratio of the pressure reducing valve 3 is adjusted mechanically in accordance with a pilot pressure through a pilot pipe 34.

In the foregoing respective embodiments, there were explained exemplary arrangements wherein the valve opening ratio of the pressure reducing valve 3 is adjusted in accordance with the detection value of the pressure sensors 11, 32, 33. Instead, as the pressure and the temperature of saturated steam exhibit a predetermined relationship with each other, a temperature sensor may be provided instead of a pressure sensor, so that the valve opening ratio of the pressure reducing valve 3 is adjusted in accordance with a detection value of the temperature sensor.

In the foregoing respective embodiments, there was explained the exemplary arrangement wherein the valve is provided with the inherent flow characteristics that the increase ratio of the flow rate (r) associated with increase of its valve opening ratio (d) is rendered smaller in the small opening ratio range than in the large opening ratio range (the inherent flow characteristics indicated by (c) in FIG. 2). Instead, the check valve 3 may be provided with an inherent flow characteristics that the increase ratio of the flow rate (r) associated with increase of its valve opening ratio (d) is rendered equivalent in the small opening ratio range with small valve opening ratios (d) and in the large opening ratio range with large valve opening ratios (d) (the inherent flow characteristics indicated by (b) in FIG. 2).

The specific arrangements such as the shape of the flow rate controlling projecting portion 30 is not limited to the semi-spherical or approximately semi-spherical shape described above, but may be a conical shape, a truncated conical shape, an angular cone shape or a truncated angular conical shape, etc. so as to obtain any desired inherent flow characteristics.

In the foregoing respective embodiments, there was explained an exemplary arrangement wherein the urging means of the check valve 10 is a compression coil spring 25. Instead, this may be comprised of an elastic body of rubber or the like or a valve structure using gravity as the urging force, etc.

In the foregoing respective embodiments, in order to realize the arrangement wherein the flow rate controlling projecting portion 30 does not contact the inner peripheral face of the valve opening 22 or the inner peripheral face of the valve seat 23 or the inflow passage 19 in the course of movement of the valve body 24 toward the valve seat 23 until it is seated on this valve seat 23, the outer diameter R1 of the valve lid portion 26 side end of the flow rate controlling projecting portion 30 is rendered equal to the inner diameter R2 of the inflow passage 19 and the inner peripheral edge of the valve opening 22 is chamfered for rendering the inner diameter R3 of the valve opening 22 slightly larger than the outer diameter R1 of the valve lid portion 26 side end of the flow rate controlling projecting portion 30. Instead of this, the outer diameter R1 of the valve lid portion 29 side end of the flow rate controlling projecting portion 30 may be set smaller than the inner diameter R2 of the inflow passage 19 and the inner diameter R3 of the valve opening 22.

INDUSTRIAL APPLICABILITY

The present invention may be suitably used in various plants or facilities having a steam-using device.

DESCRIPTION OF REFERENCE MARKS/NUMERALS 1 steam supply passage
2 re-evaporation tank
3 pressure reducing valve
4 steam ejector
4a suction portion
9 suction passage
10 check valve
22 valve opening
24 valve body
35 urging means
26 valve shaft
30 flow rate controlling projecting portion
S steam
S' passage steam through pressure reducing valve
FS re-evaporated steam
MS mixed steam
d valve opening ratio
r flow rate
A1 gap
A2 gap

The invention claimed is:

1. A steam supply system wherein:
a steam supply passage incorporates a pressure reducing valve and the passage further incorporates a steam ejector downstream of the pressure reducing valve;
a gas-liquid separator fluidly coupled with and physically connected to the pressure reducing valve;
a suction portion of the steam ejector is connected to a re-evaporation tank for re-evaporating steam condensate via a suction passage;
passage steam of the pressure reducing valve is used as a driving steam for the steam ejector; re-evaporated steam within the re-evaporation tank is suctioned by the steam ejector to be mixed with the passage steam:
the suction passage incorporates a check valve for preventing reverse flow of steam to the re-evaporation tank;
the valve opening ratio of the pressure reducing valve is adjusted in accordance with the temperature or pressure of steam on the downstream side of the steam ejector;
the check valve has an inherent flow characteristics that an increase ratio of a flow rate associated with increase of its valve opening ratio is equivalent between a small opening ratio range with small valve opening ratios and a large opening ratio range with large valve opening ratios or an inherent flow characteristics that the increase ratio is smaller in the small opening ratio range than in the large opening ratio range; and
the check valve further includes an urging means for providing an urging force for urging a valve body to a valve closing side.

2. A steam supply system wherein:
a steam supply passage incorporates a pressure reducing valve and the passage further incorporates a steam ejector downstream of the pressure reducing valve;
a gas-liquid separator fluidly coupled with and physically connected to the pressure reducing valve;
a suction portion of the steam ejector is connected to a re-evaporation tank for re-evaporating steam condensate via a suction passage;
passage steam of the pressure reducing valve is used as a driving steam for the steam ejector;
re-evaporated steam within the re-evaporation tank is suctioned by the steam ejector to be mixed with the passage steam:
the suction passage incorporates a check valve for preventing reverse flow of steam to the re-evaporation tank;
the valve opening ratio of the pressure reducing valve is adjusted in accordance with the temperature or pressure of passage steam past the pressure reducing valve;

the check valve has an inherent flow characteristics that an increase ratio of a flow rate associated with increase of its valve opening ratio is equivalent between a small opening ratio range with small valve opening ratios and a large opening ratio range with large valve opening ratios or an inherent flow characteristics that the increase ratio is smaller in the small opening ratio range than in the large opening ratio range; and the check valve further includes an urging means for providing an urging force for urging a valve body to a valve closing side.

3. A steam supply system wherein:

a steam supply passage incorporates a pressure reducing valve and the passage further incorporates a steam ejector downstream of the pressure reducing valve;

a gas-liquid separator fluidly coupled with and physically connected to the pressure reducing valve;

a suction portion of the steam ejector is connected to a re-evaporation tank for re-evaporating steam condensate via a suction passage;

passage steam of the pressure reducing valve is used as a driving steam for the steam ejector;

re-evaporated steam within the re-evaporation tank is suctioned by the steam ejector to be mixed with the passage steam:

the suction passage incorporates a check valve for preventing reverse flow of steam to the re-evaporation tank;

the valve opening ratio of the pressure reducing valve is adjusted in accordance with the temperature or pressure of the re-evaporated steam inside the re-evaporation tank;

the check valve has an inherent flow characteristics that an increase ratio of a flow rate associated with increase of its valve opening ratio is equivalent between a small opening ratio range with small valve opening ratios and a large opening ratio range with large valve opening ratios or an inherent flow characteristics that the increase ratio is smaller in the small opening ratio range than in the large opening ratio range; and the check valve further includes an urging means for providing an urging force for urging a valve body to a valve closing side.

4. A check valve for use in the steam supply system, the check valve comprising:

a valve body configured to be seated on an annular valve seat provided along an outer peripheral edge of a valve opening through face contact with the entire perimeter of the valve seat, thereby to close the valve opening;

an urging means for providing an urging force for urging the valve body to a valve closing side; and said valve opening being opened as the valve body moves away from the valve seat against the urging force of the urging means in response to a pressure of fluid entering the valve opening;

on the valve opening side of the valve body, there is provided a flow rate controlling projecting portion for controlling passing flow rate of the fluid in such a manner as to keep the area of a gap formed between a valve seat contacting portion of the valve body and an inner face of the valve opening smaller than the area of a gap formed between the valve seat contacting portion of the valve body and the valve seat when the valve body moves away from the valve seat;

a valve shaft is provided for moving-guiding the valve body along the direction perpendicular to the opening face of the valve opening, wherein a portion of the valve shaft projects outwardly from the flow rate controlling projecting portion;

the check valve has an inherent flow characteristics that an increase ratio of a flow rate associated with increase of its valve opening ratio is equivalent between a small opening ratio range with small valve opening ratios and a large opening ratio range with large valve opening ratios or an inherent flow characteristics that the increase ratio is smaller in the small opening ratio range than in the large opening ratio range; and said fluid rate controlling projecting portion has an outer contour configured to obtain said inherent flow characteristics.

5. The check valve according to claim 4, wherein:

the flow rate controlling projecting portion has a shape having symmetry or approximate symmetry about a center axis of the opening face of the valve opening.

6. The check valve according to claim 4, wherein the flow rate controlling projecting portion has such an outer contour that in the process of movement of the valve body toward the valve seat until it is seated on the valve seat, the flow rate controlling projecting portion does not contact the inner peripheral face of the valve opening or the valve seat.

7. The check valve according to claim 5, wherein the flow rate controlling projecting portion has such an outer contour that in the process of movement of the valve body toward the valve seat until it is seated on the valve seat, the flow rate controlling projecting portion does not contact the inner peripheral face of the valve opening or the valve seat.

* * * * *

UNITED STATES PATENT AND TRADEMARK OFFICE
CERTIFICATE OF CORRECTION

PATENT NO. : 8,881,761 B2  Page 1 of 1
APPLICATION NO. : 13/497437
DATED : November 11, 2014
INVENTOR(S) : Naoki Matsukawa It is certified that error appears in the above-identified patent and that said Letters Patent is hereby corrected as shown below:

In the Claims,

Column 13, Line 43, Claim 4, delete "the" and insert -- a --

Column 14, Line 16, Claim 4, delete "moving-guiding" and insert -- moving/guiding --

Signed and Sealed this
Tenth Day of March, 2015

Michelle K. Lee
*Deputy Director of the United States Patent and Trademark Office*